(12) United States Patent
Alders et al.

(10) Patent No.: US 11,589,523 B2
(45) Date of Patent: Feb. 28, 2023

(54) AGRICULTURAL SPRAYING MACHINE HAVING A SPRAYING LINKAGE

(71) Applicant: Deere & Company, Moline, IL (US)

(72) Inventors: Dirk Alders, Overloon (NL); Benedikt Jung, Kaiserslautern (DE); Matthias Meyer, Kaiserslautern (DE); Willy Peeters, Overloon (NL); Ivo Op Het Veld, Waldfeucht (DE); Artur Schuhmacher, Dellfeld (DE); Kilian Jung, Kaiserslautern (DE); Jörg Seewig, Kaiserslautern (DE); Viktor Follmann, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 428 days.

(21) Appl. No.: 16/840,310

(22) Filed: Apr. 3, 2020

(65) Prior Publication Data

US 2020/0315108 A1 Oct. 8, 2020

(30) Foreign Application Priority Data

Apr. 3, 2019 (DE) .......................... 102019204775.0

(51) Int. Cl.
*A01G 25/09* (2006.01)
*A01G 25/16* (2006.01)
*B60P 3/30* (2006.01)

(52) U.S. Cl.
CPC ........... *A01G 25/092* (2013.01); *A01G 25/16* (2013.01); *B60P 3/30* (2013.01)

(58) Field of Classification Search
CPC .......... A01G 25/092; A01G 25/16; B60P 3/30
See application file for complete search history.

(56) References Cited

U.S. PATENT DOCUMENTS

| 5,348,226 A * | 9/1994 | Heiniger ............. A01M 7/0057 239/164 |
| 2004/0158381 A1* | 8/2004 | Strelioff .............. A01M 7/0057 340/440 |

(Continued)

FOREIGN PATENT DOCUMENTS

| EP | 3058820 A1 | 8/2016 |
| EP | 3072379 A1 | 9/2016 |

(Continued)

OTHER PUBLICATIONS

European Search Report issued in counterpart application No. 20164563.7 dated Aug. 13, 2020 (08 pages).

(Continued)

*Primary Examiner* — Gary Collins
(74) *Attorney, Agent, or Firm* — Hanley, Flight & Zimmerman, LLC

(57) ABSTRACT

An agricultural spraying machine which is supported on the ground and is movable in a forward direction over a field, the agricultural spraying machine comprising: a chassis; a sprayer linkage, the sprayer linkage configured with a middle segment movably supported on the chassis; a pair of booms arranged on respectively one side of the middle segment and which are pivotable by respectively at least one actuator in relation to the middle segment about an axis extending in the forward direction; a control device configured to receive a signal from at least one sensor associated with the pair of booms and generate a control signal, the control device receiving the signal from the at least one sensor as an input variable and wherein the control device receives the signals provided by the at least one sensor in respect of the relative position of the pair of booms in relation to a field contour; and wherein an adjustment of the at least one actuator occurs using control signals from the control device, the control signals being respectively depen- (Continued)

dent on the input variables and configured to drive the actuator on with a view to maintaining the positions of the booms in a desired position above the field contour wherein due to the mechanical coupling of the pair of booms by the middle segment, also results in a movement of other respective booms.

11 Claims, 2 Drawing Sheets

(56) References Cited

U.S. PATENT DOCUMENTS

| | | |
|---|---|---|
| 2011/0282554 A1 | 11/2011 | Keye |
| 2016/0286780 A1* | 10/2016 | Leeb .................... A01M 7/0057 |
| 2016/0316617 A1* | 11/2016 | Leeb ......................... B60P 3/30 |
| 2016/0330948 A1* | 11/2016 | Schnaider ........... A01M 7/0085 |

FOREIGN PATENT DOCUMENTS

| | | |
|---|---|---|
| EP | 3165090 A1 | 5/2017 |
| EP | 3357333 A1 | 8/2018 |
| EP | 3440934 A1 | 2/2019 |
| FR | 3019969 A1 | 10/2015 |

OTHER PUBLICATIONS

J. Anthonis et al., SVD H∞ Controller Design for an Active Horizontal Spray Boom Suspension, Proceedings of the 7th Mediterranean Conference on Control and Automation (MED99) Haifa, Israel—Jun. 28-30, 1999; pp. 90-102.

H. Ramon et al., Design of a multivariable electro-hydraulic compensator for active vibration control of a flexible spray boom, Acta horticulturae 406 (1996), pp. 267-280.

G. Weihrich, Mehrgrößen-Zustandsregelung unter Einwirkung von Stör- und Führungssignalen, Regelungstechnik 1977, pp. 166 to 172 and 204 to 208.

* cited by examiner

AGRICULTURAL SPRAYING MACHINE HAVING A SPRAYING LINKAGE

The invention relates to an agricultural spraying or spreading machine, specifically an agricultural spraying machine having a spraying linkage and having a chassis which is supported on the ground and is movable in a forward direction over a field.

BACKGROUND

Spraying or spreading machines, usually referred to as field sprayers, serve to apply agricultural products on a field. The field sprayers can be designed as self-propelled or towed vehicles or can be releasably attached to a carrier vehicle (tractor). They comprise a relatively wide sprayer linkage, which can be folded in for transport purposes and on which nozzles for applying the product are distributed over the width of the sprayer linkage. The products are usually constituted by liquids, which serve for the fertilization of plants cultivated on the field or for the diseases or pests or weeds. Generally, the product is intended to be applied in predetermined volumes per unit of area, which volumes are constant over a field or can vary on a site-specific basis, for which reasons the nozzles are opened and closed on a pre-planned application volume map and/or under the control of sensors. In order to be able to apply the desired volume, it is important that a sprayer linkage supporting the nozzles serving for the application of the product is moved at a defined height above the ground. If it is too high, the product is spread over too large a region, and if the sprayer linkage is too low, the product is delivered only in too small a region.

The positioning of the sprayer linkage at the desired height above the field contour is made more difficult by possible variations in the field contour (i.e. different heights of the plants above the ground and/or uneven ground contours), and by vehicle movements which impact as disturbing movements on the sprayer linkage. In order to react to a changing field contour, the sprayer linkage has degrees of freedom and actuators which enable the geometry of the sprayer linkage to be adapted to the field contour. Usually, a middle segment of the sprayer linkage can be rotated by an actuator, about an axis extending in the forward direction, in relation to a suspension which is adjustable in height in relation to the vehicle and is rotatable about the forward axis, and a left and right boom are respectively pivoted by an actuator, about an axis extending in the forward direction, in relation to the middle segment. In order to minimize vibration movements, suspension systems having springs and dampers between the vehicle and the suspension of the middle segment, which allow a damped rotary movement between the vehicle and the middle segment about the forward axis, are used.

SUMMARY

An agricultural spraying machine is equipped with a sprayer linkage and a chassis which is supported on the ground and is movable in a forward direction over a field, in which: the sprayer linkage comprises a middle segment, which is movably supported on the chassis, and two booms, which are arranged on respectively one side of the middle segment and which are pivotable by respectively one actuator in relation to the middle segment about an axis extending in the forward direction; the actuators are drivable by a control device, to which can be fed signals provided by sensors in respect of the relative position of both booms in relation to a field contour and which can be operated to drive the actuators on the basis of the signals with a view to maintaining the positions of the booms in a desired position above the field contour, and an adjustment of an actuator, due to the mechanical coupling of the booms by the middle segment, also results in a movement of the respectively other boom; and the control device comprises a multi-variable controller, to which the signals of both sensors can be fed as input variables and which is arranged to provide control signals for both actuators, which are respectively dependent on both input variables.

An agricultural spraying control system for an agricultural sprayer having a chassis and a middle segment and pair of booms movably supported on the chassis, the spraying control system comprising: a control device configured to receive a signal from at least one sensor associated with the pair of booms and generate a control signal, the control device receiving the signal from the at least one sensor as an input variable and wherein the control device receives the signals provided by the at least one sensor in respect of the relative position of the pair of booms in relation to a field contour; and at least one actuator for adjustment of at least one of the pair of booms and the middle segment using the control signal from the control device, the control signal being respectively dependent on the input variables and configured to drive the actuator to maintain the positions of the pair booms in a desired position above the field contour and wherein due to the mechanical coupling of the pair of booms by the middle segment, also results in a movement of other respective booms.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
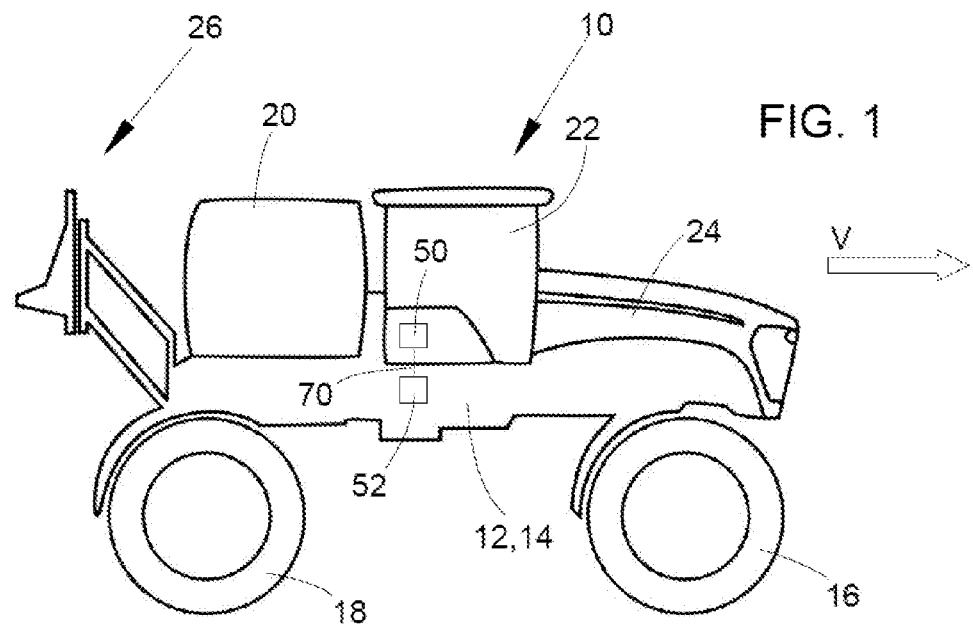
FIG. 1 shows a lateral view of a spraying machine designed as a self-propelled field sprayer.

In one example of an agricultural spraying or spreading machine, the adaptation of the geometry of the sprayer linkage to the field contour is hence realized by three actuators, of which one rotates the middle segment in relation to the vehicle about the forward axis and the two others rotate the booms in relation to the middle segment about the forward axis. The damping of the rotational axis of the suspension of the middle segment in relation to the vehicle is constant or variable (European Patent Appl. No. 3 357 333 A1), and the height adjustment of the suspension is generally realized only at the beginning of an operation to adapt to the plant height.

In one example, a multi-variable controller is configured to account for the mutual influencing of the actuators when calculating the control signals is used, whereby the problems mentioned in the introduction are at least partially remedied. The middle segment can be adjustable by a third actuator in relation to the chassis about an axis extending in the forward direction, the control signal of which actuator can be provided by the multi-variable controller in dependence on both input variables. To the multi-variable controller can thus be fed a further input variable, which represents the angle, registered by sensors, of the middle segment in relation to the field contour, and the multi-variable controller can be able to be operated to create the control signals of all actuators respectively in dependence on all input variables. The middle segment can be fastened to a suspension, which is mounted rotatably in relation to the chassis about an axis extending in the forward direction and is coupled to the chassis by a spring and/or a damping element.

The control device can comprise a state controller, to which can be fed measurable variables, registered by sensors, in respect of the motional state of the booms and/or of the middle segment and/or of the suspension, and the output signals of which can be combined with the output signals of the multi-variable controller in order to generate the control variable of the actuators. The control device can alternatively or additionally comprise a feedforward control, to which can be fed signals, registered by sensors, in respect of a movement of the chassis, and the output signals of which can be combined with the output signals of the multi-variable controller in order to generate the control variable of the actuators. The control device can comprise a Kalman filter or observer, to which can be fed the control variables of the actuators and the measurable variables in respect of the motional state and/or in respect of a movement of the chassis, and the output signal of which can be fed as an input signal to the feedforward control and/or to the state controller.

In one example, there are thus generally three actuators present, which shall be driven for adaptation to the field contour. Due to the non-rigid suspension of the middle segment and the relatively large mass of the booms, an adjustment of one of the actuators of a boom also leads to a movement of the other, non-adjusted boom. In particular when the two actuators for adjusting the booms are guided independently of one another, under the control of corresponding sensors, at a predetermined height above the plant cover or the ground, both booms (due to the mutual influencing by the middle segment) swing mutually up, which leads to a vibration of the sprayer linkage and prevents a positional adjustment of the booms, or at least makes this more difficult.

It has been proposed to adjust the booms in dependence on one another, i.e. upon the adjustment of one boom, to also drive the other boom in the opposite direction (European Patent Appl. No. 3 058 820 A1 with symmetrical adjustment of the booms, or French Patent Appl. No. 3 019 969 A1 with oppositely directed adjustment of one boom proportionally to the adjustment of the other boom), or to drive both booms in the same direction by an outer control loop for adaptation to the field contour, and the middle segment by an inner control loop, which serves for the stabilization and decoupling of the booms (European Patent Appl. No. 3 165 090 A1). In these arrangements, an actuator (or a plurality of actuators) is respectively adjusted on the basis of a comparison between a desired value (which can be based on one or more input parameters) and an actual value; which suggests a so-called single-variable controller (single input, single output, SISO).

Previous attempts have been made to reduce a system comprising a plurality of input variables, including, inter alia, the heights of the booms above the field contour, and a plurality of mutually influencing output variables, including at least the actuators for controlling the booms in relation to the middle segment, to separate input and control variables, so that parallelly working single-variable controllers or those working in cascaded configuration are used. In this context, reference should be made to J. Anthonis et al, SVD $H^-$ Controller Design for an Active Horizontal Spray Boom Suspension, Proceedings of the 7th Mediterranean Conference on Control and Automation (MED99) Haifa, Israel—Jun. 28-30, 1999; pages 90-102, where a multi-variable regulation for the damping of horizontal vibrations in a boom of a field sprayer is broken down into independent, non-mutually-influencing control variables for translation and rotation in order to be able to realize these with single-variable controllers. In the Anthonis field sprayer, this breakdown into independent control variables, due to the mutual influencing of the input and control variables, is not completely possible, however, and a controlling of the field sprayer with the single-variable controllers which are provided in the prior art and work in parallel or in cascaded operation cannot be optimally represented.

Previous attempts have also focused on field sprayers having so-called multi-variable controllers. For instance, European Patent Appl. No. 3 072 379 A1 mentions a field sprayer having a linkage which is pivotable in the forward direction and is adjustable in height, which linkage is driven with a multi-variable controller, which, moreover, also controls the speed of travel. Analogously to a harvesting attachment which is discussed in the remaining description and is adjustable in height and inclination to a desired value, these control variables are controlled in such a way that the pitching vibrations of the vehicle are minimized. However, the function performed by the multi-variable controller does not here relate, in any event in respect of the controlling of the linkage, to a multi-variable problem, since the height and inclination of the linkage are variables which are independent of each other and are not mutually influencing.

Finally, H. Ramon et al, Design of a multivariable electrohydraulic compensator for active vibration control of a flexible spray boom, Acta horticulturae 406 (1996), pages 267-280 describes a sprayer linkage for a field sprayer, which is said to be vibration-damped in the horizontal direction by actively driven hydraulic cylinders. Two inner control loops respectively control a hydraulic cylinder, each of which is assigned to a boom, on the basis of a feedback variable (control force), and an outer control loop determines by a Kalman filter, on the basis of sensors for the movement of the booms, a vibration state of the system and prescribes to both inner control loops the control variables dependent on the vibration state. Presumably due to the complexity of the model required to detect the vibration state, the authors (cf. J. Anthonis et al, at the reference quoted) have subsequently gone over to breaking down the problem into independent control variables for translation and rotation of the sprayer linkage.

Figure 2:
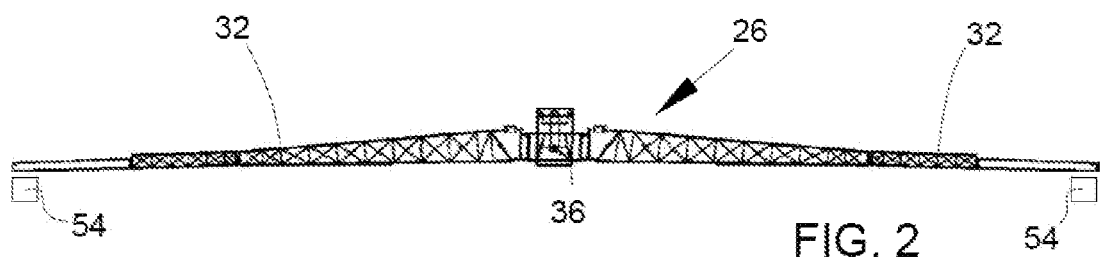
FIG. 2 shows a rear view of the extended sprayer linkage of the spraying machine of FIG. 1.
Figure 3:
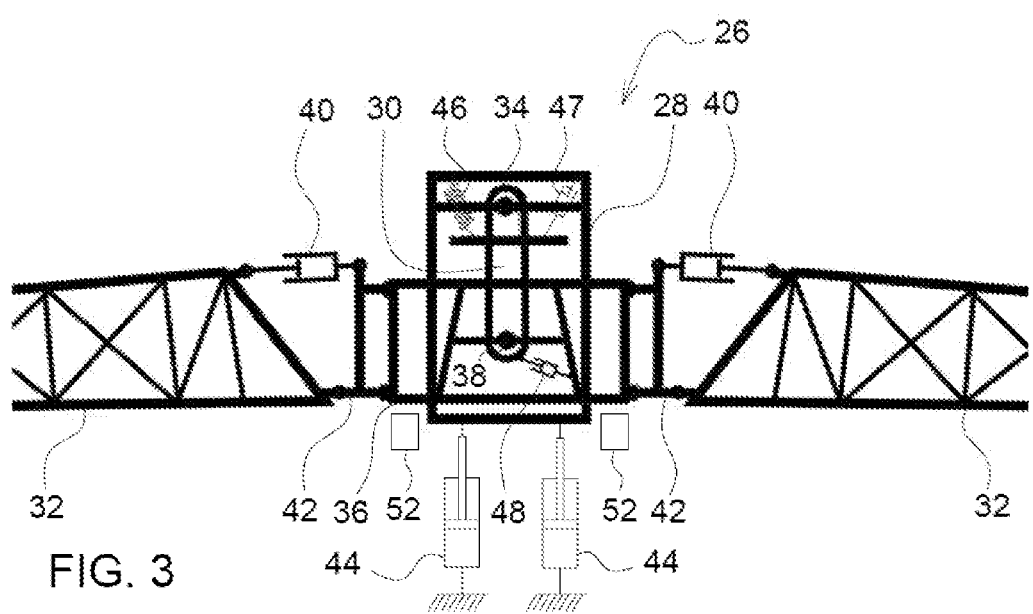
FIG. 3 shows an enlarged, rear view of the middle part of the sprayer linkage of FIG. 2.

FIG. 1 shows a spraying machine 10 for applying liquid active substances, in the form of a self-propelled vehicle, which, as an alternative to the self-propelled embodiment, could be designed as an implement that is fittable to a tractor or is towed. The spraying machine 10 comprises a chassis 12 having a frame 14 which is supported on front wheels 16 and rear wheels 18 on the ground. The wheels 16, 18 can be steerable and drivable. Resting on the frame 14 are a tank 20 for the active substances and a cab 22, in front of which latter is found an engine compartment 24. The usual direction of travel V during operation is in FIG. 1 directed to the right. Of course, the spraying machine 10 can also travel in reverse and, in the process, also apply spray. Toward the rear, to the frame 14 of the spraying machine 10 is attached a sprayer linkage 26, which is adjustable in inclination and height and which, in FIGS. 2 and 3, is represented in a rear view.

Attached to the frame 14 in a height-adjustable manner, by coupled actuators 44 in the form of hydraulic cylinders, is an adjustable frame 28. On this adjustable frame 28, a suspension 30 is mounted rotatably about an axis 34 extending in the forward direction V. On the suspension 30, a middle segment 36 of the sprayer linkage 26 is mounted rotatably about an axis 38 extending in the forward direction V. Two booms 32 of the sprayer linkage 26 are attached on left and right to the middle segment 36 and, via actuators 40 in the form of hydraulic cylinders, are adjustable in relation to the middle segment 36 about axes 42 extending in the forward direction V. The middle segment 36 and the two booms 32 together form the sprayer linkage 26, which is provided with nozzles for applying the active substances from the tank 20.

The suspension 30 is mounted rotatably in relation to the adjustable frame 28 about the axis 34 and is sprung and damped by a spring 46 and a damper 47 in relation to a rotation about the axis 34. The spring 46 and the damper 47 could also be replaced or supplemented by one or more hydraulic cylinders (not shown), which assume their function and provide a constant or variable damping. Furthermore, the middle segment 36 of the sprayer linkage 26 is rotatable in relation to dem pendulum 30, likewise by means of an actuator 48 in the form of a hydraulic cylinder, about the axis 38 extending in the forward direction V.

A control device 50 (see FIGS. 4 and 5) is connected via suitable valves to the actuators 40, 44 and 48 and, for the guidance and controlling of the sprayer linkage, can perform the following adjustments:

1) Vertical guidance: the height of the middle segment 36 of the sprayer linkage 26 is adjusted by an up and down adjustment of the adjustable frame 28 in relation to the frame 14 via parallel kinematics by means of the hydraulically actuated actuators 44.
2) Offsetting of the sprayer linkage 26 in relation to the suspension: The middle segment 36 of the sprayer linkage 26 is rotationally adjusted in relation to the suspension 30 by the actuator 48. The rotational axis 38 here runs parallel to the vehicle longitudinal direction and the forward direction V.
3) Adaptation of the sprayer linkage geometry: The two booms 32 of the sprayer linkage 26 are tilted by means of the actuators 40 in relation to the middle segment 36 of the sprayer linkage 26. The rotational axis 42 here runs parallel to the vehicle longitudinal axis and forward direction V.

Other actuating elements (not shown) may be required to shift the sprayer linkage 26 between the shown working position and folded-in transport position. For the shifting between working and transport position, resort can partially be made to the actuator elements already described. Thus, the hydraulic cylinders 44, for instance, are used to lower the sprayer linkage 26, once collapsed, into the transport locking mechanism.

While the actuators 44 are adjusted by the control device 50 generally on the basis of operator inputs at the beginning of an operation on a field and are not adjusted during the application, the control device 50, during the operation in which sprays are distributed on a field, realizes a continuous driving of the actuators 40 and 48. To this end, sensors 52, 54 are provided, which sensors are configured as rangefinders (for instance ultrasound sensors, laser rangefinders or a stereo camera) and register the height of the outer ends of the booms 32 above the plant cover on the field or on the ground of the field (sensors 54), or the height of the two lateral ends of the middle segment 36 above the plant cover on the field or on the ground of the field. The control device 50 is further connected to an operator interface 56, with which a default for the position (i.e. height) of the sprayer linkage 26 above the field contour (plant canopy or ground) can be inputted by the operator of the spraying machine 10, or this default is generated by any chosen automatic system which can detect, for example, the state of the plants or retrieve this from a databank and derive therefrom a suitable working height of the sprayer linkage 26.

Figure 4:
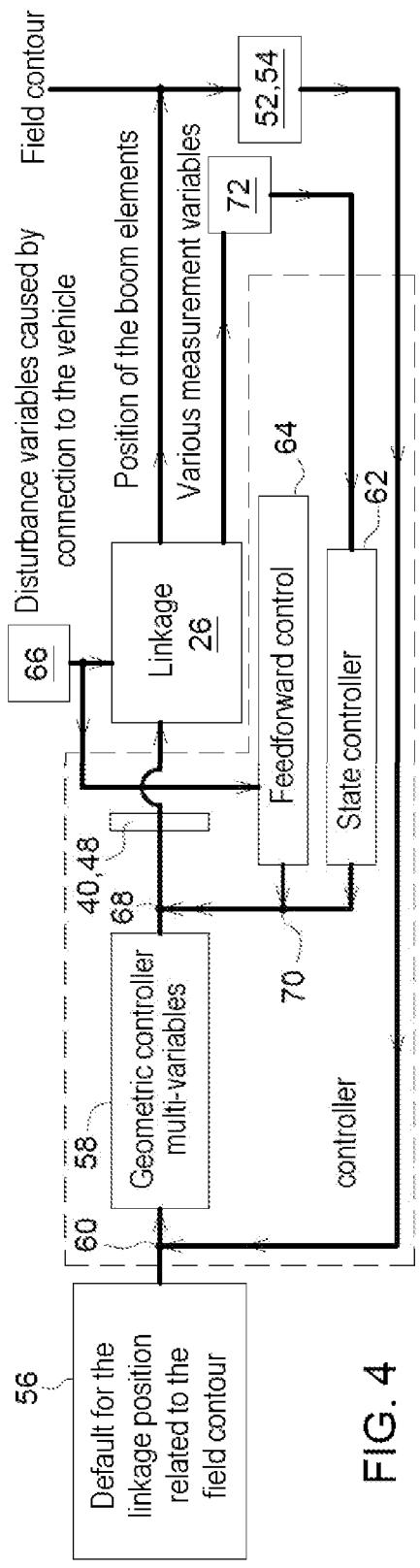
FIG. 4 shows a diagram of a first embodiment of a control device.

In the example shown in FIG. 4, the control device 50 comprises a geometric controller, which is designed as a multi-variable controller 58 and serves to generate control variables for driving the actuators 40 and 48. The multi-variable controller 58 receives signals from the sensors 52 and 54. The signals of the sensors 52 are hereupon converted into a single signal, which indicates the difference in rotation angle between the middle segment 36 and the field contour, i.e. the deviation of the middle segment 36 from an orientation parallel to the field contour. These three signals of the sensors 52, 54 in respect of the height of the outer ends of the booms 32 and of the orientation of the middle segment 36 in relation to the field contour are compared by a subtractor 60 with the desired value (preset by the operator interface 56 or automatic system) for the height, which is generally the same for both booms 32, and with a desired value of the angle of the middle segment 36 in relation to the field contour, which is usually 0°, and any deviations of the actual values from the desired values are fed as input variables to the multi-variable controller 58.

The multi-variable controller 58 generates on the basis of the input variables (dependent on the signals of the sensors 52, 54) the three mutually independent control variables for the actuators 40 and 48. Each of the control variables is herein dependent on all three input variables. The multi-variable controller 58 hence takes account of the influence which each input variable has on each control variable, in order to take account of the mutual mechanical influencing of the actuators 40, 48. If, therefore, only the right sensor 54 registers a deviation from the desired height, not only is the right actuator 40 adjusted in order to compensate for the deviation, but also the actuator 48 is adjusted, since the adjustment of the right actuator 40 leads also to a change in the inclination of the middle segment 36, which is attached by the spring 46 and the damper 47 to the suspension 30, and the left actuator 40 is adjusted, since also the inclination of the middle segment 36 hereupon changes, which leads to a movement of the left boom 32, which is suspended from the middle segment 36. Analogously, both actuators 40 are adjusted if the sensors 52 register a deviation of the lateral inclination of the middle segment 36 from the desired value, and the right actuator 40 and the actuator 48 if the left sensor 54 registers a deviation from the desired value. In the multi-variable controller 58, the mutual dependencies of the input and output values are taken into account and each control variable is dependent on each input variable. The multi-variable controller 58 is, in particular, a multi-dimensional PID controller, under which fall sub-groups such as PD controllers or PI controllers.

Hence the control principles of a multi-variable controller 58 are here applied to the sprayer linkage 26. The multi-variable controller 58 is capable of driving the actuators 40 and 48 on the basis of the signals of the sensors 52 and 54, and of here taking account of the mutual influencing of the actuators 40, 48. The main function which the geometric controller must here fulfil is to repeatedly adjust the booms 32 and the middle segment 36 in order to maintain the desired contour. For this purpose, in the simplest case a 3×3 matrix with inputs on the main diagonals could be used, which matrix is multiplied by the input vector (consisting of the three mentioned input variables) in order to acquire the control variable vector. In a further embodiment, the multi-variable controller 58 could contain a mathematical model of the system to be controlled, which model represents the impact which each input variable has on each control variable and can be created by measurements or theoretical considerations.

In the embodiment according to FIG. 4, a state controller 62 and an optional feedforward control 64 are additionally provided, the output values are applied via adders 70 and a subtractor 68 to the control signals of the multi-variable controller 58. Using measurable variables registered by sensors 72 (for example potentiometers or inertial sensors) which register, for instance, the rotation angles and/or rotary angular velocities of the booms 32, of the middle segment 36 and of the suspension 30, and/or the pressure in the actuators 40, 48, the state controller 62 can determine or evaluate a motional state of the sprayer linkage 26, and add therefrom derived corrections for improving the motional state of the sprayer linkage 26 to the control signal of the multi-variable controller as the control signal to the actuators 40, 48. Analogously, the feedforward control 64 can register a state of the chassis 12 (for example its inclination in the lateral direction, in the forward direction and about the vertical axis, the deflection of the spring 46 or of the damper 47, the pressure in the actuator 44 and/or the pressure in a hydraulic running gear suspension and/or the deflection of a springing of the running gear of the chassis 12) by sensors 66, and, where appropriate, add changes impacting on the sprayer linkage 26 and resultant possible corrections for improving the constancy of the position of the sprayer linkage 26 in relation to the field, to the control signal of the multi-variable controller as the control signal to the actuators 40, 48.

The state controller 62 and the feedforward control 64 provide optional Improvements in order to jointly take account of the respective motional state of the sprayer linkage 26 and/or of the chassis 12. In multi-variable control systems, such arrangements are intrinsically common (cf. G. Weihrich, Mehrgrößen-Zustandsregelung unter Einwirkung von Stör- and Führungssignalen, Regelungstechnik 1977, pages 166 to 172 and 204 to 208). The arrangement of the state controllers 62 and the feedforward control 64 according to FIG. 4 can be applied if the used sensors 72, and, where appropriate, 66, are capable of registering sufficiently well, by metrological technology, the state variables (sensors 72) and disturbance variables (sensors 66).

Figure 5:
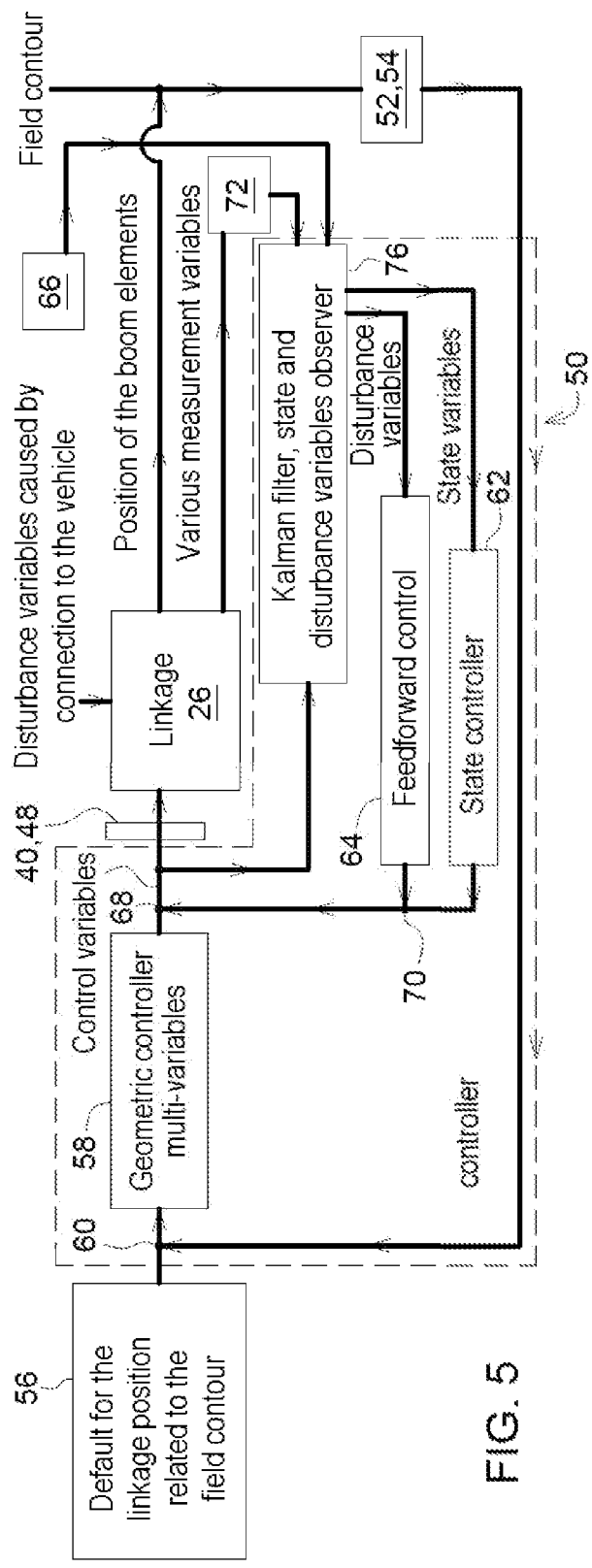
FIG. 5 shows a diagram of a second embodiment of a control device.

If, on the other hand, not all state variables and/or disturbance variables can be registered with sufficient accuracy, a Kalman filter and/or state and disturbance variable observer 76, as in the embodiment according to FIG. 5, can additionally be present, which receives input signals from the sensors 66 and 72 and the control variables of the actuators 40, 48 and loads the state controller 62 and the feedforward control with the state and disturbance variables. In the arrangement according to FIG. 5, a Kalman filter or a state and/or disturbance variable observer can selectively be used. The Kalman filter can be employed if all state variables are measurable, yet noisy. The state observer is employed only a part of the state variables is measurable; in which case it derives the other state variables form the available measurable variables. Analogously, the disturbance variable observer can be used where the disturbance variables are not or only partially measurable.

In summary, it can be noted that the components of the control system have the following functions:
1) Geometric controller (multi-variable controller (58)): maintenance of the positions of the booms 32 and of the middle segment 36 in a desired position above the field contour.
2) State controller 62: stabilization of the linkage with booms 32 and middle segment 36.
3) Disturbance variable feedforward 64: anticipatory pre-controlling of the linkage.

In order, in addition, to minimize the disturbance movements from the track to the linkage, all three mentioned controllers must be correctly parameterized relative to one another. For this function, the state controller 62 and the feedforward control 64 are crucial.

It should further be noted that the (all relatively thickly illustrated) arrows in FIGS. 4 and 5 respectively indicate that respectively a plurality of different signals are transmitted. The actuators 40, 48 are here described as hydraulic cylinders, but could be replaced by electric motors or pneumatic cylinders, or so-called pneumatic or hydraulic muscles.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of a skilled artisan in light of this disclosure. In addition, those skilled in the art will appreciate that the mechanisms of the subject matter described herein are capable of being distributed as a program product in a variety of forms, and that an illustrative embodiment of the subject matter described herein applies regardless of the type of signal bearing medium used to carry out the distribution. Examples of a signal bearing medium include, but are not limited to, the following: an edge computing module or device; a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a computer system or computing element (or portion thereof) such as, but not limited to, one or more or some combination of: a visual organizer system, a request generator, an Internet coupled computing device, a computer server, etc. In one example, the computer system and/or the computing element may manipulate and transform information and/or data represented as physical (electronic) quantities within the computer system's and/or computing element's processor(s), register(s), and/or memory (ies) into other data similarly represented as physical quantities within the computer system's and/or computing element's memory(ies), register(s) and/or other such information storage, processing, transmission, and/or display components of the computer system(s), computing element (s) and/or other electronic computing device(s). Under the direction of computer-readable instructions, the computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The invention claimed is:

1. An agricultural spraying machine which is supported on a ground and is movable in a forward direction over a field having a field contour, the agricultural spraying machine comprising:
  a chassis including a suspension having a longitudinal axis;
  a sprayer linkage including:
  a middle segment movably supported on the chassis, the middle segment including a first side and a second side;

a first boom having a first proximal end and a first distal end, wherein the first proximal end is mechanically coupled on the first side of the middle segment and a second boom having a second proximal end and a second distal end, wherein the second proximal end is mechanically coupled on the second side of the middle segment a first actuator coupled to the first boom and to the middle segment to pivot the first boom about the longitudinal axis relative to the middle segment a second actuator coupled to the second boom and to the middle segment to pivot the second boom about the longitudinal axis relative to the middle segment a third actuator coupled to the middle segment and to the suspension to adjust a position of the middle segment relative to the suspension;

a first sensor associated with the first distal end of the first boom, wherein the first sensor is to generate a first signal associated with a relative position of the first boom in relation to the field contour; and a control device configured to receive the first signal from the first sensor and generate a first control signal to adjust the first actuator, the second actuator, and the third actuator to adjust the position of the first boom, the second boom, and the middle segment in respect of a relative position of the first boom and second boom in relation to the field contour.

2. The spraying machine of claim 1, wherein the suspension is coupled to the chassis by at least one of a compressible or damping element.

3. The spraying machine of claim 1, a second sensor associated with the second distal end of the second boom, wherein the second sensor is to generate a second signal associated with a relative position of the second boom in relation to the field contour.

4. The spraying machine of claim 3, wherein the control device configured to receive both the first signal and the second signal and to generate a second control signal to adjust the first actuator, the second actuator, and the third actuator to adjust the position of the first boom, the second boom, and the middle segment in respect of the relative position of the first boom and the second boom in relation to the field contour.

5. The spraying machine of claim 4, wherein the control device comprises a state controller, the state controller determining a motional state of the sprayer linkage by a state variable sensor receiving a state variable and feeding corrections for improving the motional state of the sprayer linkage to the control device, and therefrom, the first control signal or the second control signal.

6. The spraying machine of claim 5, wherein the control device comprises a feedforward control, the feedforward control determining a motional state of the chassis by a disturbance variable sensor receiving a disturbance variable and feeding corrections for improving the motional state of the chassis to the control device, and therefrom, the first control signal or the second control signal.

7. The spraying machine of claim 6, wherein the control device comprises a Kalman filter or observer, the Kalman filter or observer receiving a state signal from the state variable sensor and a disturbance signal from the disturbance variable sensor and feeding the state signal and the first and/or second control signal to the state controller and the disturbance signal and the first and/or second control signal to the feedforward control.

8. The spraying machine of claim 4, a third sensor associated with an inner end of the first boom, wherein the third sensor is to generate a third signal associated with a relative position of the first boom in relation to the field contour.

9. The spraying machine of claim 8, a fourth sensor associated with an inner end of the second boom, wherein the fourth sensor is to generate a fourth signal associated with the relative position of the second boom in relation to the field contour.

10. The spraying machine of claim 9, wherein the control device configured to receive both the third signal and the fourth signal and to generate a third control signal representing an angle between the middle segment and the field contour to adjust the position of the first boom and the second boom in respect of the relative position of the first boom and the second boom in relation to the field contour.

11. An agricultural spraying control system for an agricultural sprayer having a chassis and a middle segment and a first boom and a second boom movably supported on the chassis, the spraying control system comprising:

a first actuator coupled to the first boom and to the middle segment to pivot the first boom about a longitudinal axis relative to the middle segment a second actuator coupled to the second boom and to the middle segment to pivot the second boom about the longitudinal axis relative to the middle segment a third actuator coupled to the middle segment and to a suspension to adjust a position of the middle segment relative to the suspension;

a sensor associated with a distal end of the first boom, wherein the sensor is to generate a signal associated with a relative position of the first boom in relation to a field contour; and a control device configured to receive the signal from the sensor and to generate a control signal to adjust the first actuator, the second actuator, and the third actuator to adjust the position of the first boom, the second boom, and the middle segment in respect of a relative position of the first boom and second boom in relation to the field contour.

* * * * *